United States Patent [19]

Bessho

[11] 4,446,823
[45] May 8, 1984

[54] INTERNAL COMBUSTION ENGINE PASSAGE CONSTRUCTION WITH INTAKE TUBES EXTENDING ALONG SURGE TANK WALL

[75] Inventor: Hironori Bessho, Susono, Japan
[73] Assignee: Toyota Jidosha Kabushiki Kaisha, Toyota, Japan
[21] Appl. No.: 321,193
[22] Filed: Nov. 13, 1981
[51] Int. Cl.$^3$ .............................................. F02B 75/13
[52] U.S. Cl. ............................................ 123/52 MB
[58] Field of Search ........................ 123/52 M, 52 MB

[56] References Cited

U.S. PATENT DOCUMENTS

| 4,175,504 | 11/1979 | Ederer et al. | 123/52 M |
| 4,183,332 | 1/1980 | Hofbauer et al. | 123/52 M |
| 4,341,186 | 7/1982 | Mayr et al. | 123/52 M |

FOREIGN PATENT DOCUMENTS

| 0957802 | 2/1957 | Fed. Rep. of Germany | 123/52 M |
| 0597796 | 11/1925 | France | 123/52 M |

*Primary Examiner*—Craig R. Feinberg
*Attorney, Agent, or Firm*—Stevens, Davis, Miller & Mosher

[57] ABSTRACT

An internal combustion engine has several cylinders. A construction is provided for the intake system of the engine, including a surge tank with an inlet through which air is admitted, and one intake tube for each cylinder. Each of the intake tubes is defined by a wall, and leads from the surge tank to its cylinder. An upstream part of each intake tube is wrapped around the surge tank and extends along its wall. Desirably, the wall of this wrapped upstream part of each intake tube may in part be constituted by the outer part of the wall of the surge tank. A part of each intake tube downstream of this wrapped upstream part may be wrapped along the wrapped upstream part. Further, the construction may be made from two dish members joined together at their edges, with the surge tank being defined at the inside of the combination by two inner skins of the dish members, while the intake tubes are defined around the surge tank by two outer structures of the dish members and also by the outer surfaces of the two inner skins. The dish members may be formed by casting, and may be fixed together by bolts passed through holes in flanges extending outwardly from their joined edges.

3 Claims, 3 Drawing Figures

INTERNAL COMBUSTION ENGINE PASSAGE CONSTRUCTION WITH INTAKE TUBES EXTENDING ALONG SURGE TANK WALL

BACKGROUND OF THE INVENTION

The present invention relates to an intake passage construction for an internal combustion engine, and more particularly relates to an intake passage construction for a fuel injection type internal combustion engine.

In general, with regard to the design of intake systems for internal combustion engines, it has long been known that correct designing of the length of the intake passage which introduces gas into each cylinder of the engine is important for improving the volumetric efficiency and therefore the power output and the drivability of the engine, in order to take proper advantage of the intake pulsation effect and the intake inertia effect. Further, in the case of a multi cylinder internal combustion engine, it is also important to take account of and to minimize as far as possible the intake interference effect, in which interference between the various cylinders of the engine during their intake strokes reduces engine volumetric efficiency, thus reducing engine power output and drivability. Thus, the length of the intake passages should be determined in view of these various considerations, and quite often should ideally be quite long.

In the case of fuel injection engines, generally a surge tank is provided in the intake system of the engine, in order to reduce any surging of air that may tend to take place in this intake system, and individual intake tubes for each individual cylinder are extended from this surge tank, one to each of the cylinders. The relevant intake passage lengths in such a construction, for the intake pulsation effect, the intake inertia effect, and the intake interference effect, are the lengths of these individual intake tubes. Therefore, in order to obtain the best possible intake volumetric efficiency for the internal combustion engine, the lengths of these intake tubes must be set to appropriate values during the design process.

However, the space available in the engine room of an automobile is limited, and if a surge tank, which typically is quite large, must be fitted in this engine room, the freedom of design as to the location of said surge tank is quite limited, from the point of view of assembly convenience, servicing convenience, and the like. Further, the actual dimensional bulk of such a set of quite long intake tubes often also presents a similar problem of difficulty in design. Accordingly, it is often not possible to put the surge tank quite a long way away from the internal combustion engine, and in the prior art this has meant that it has not been possible to design the lengths of the intake tubes which lead to the various cylinders in the most advantageous way, so as to take advantage of the intake pulsation effect and of the intake inertia effect, and so as to minimize the intake interference effect.

SUMMARY OF THE INVENTION

Accordingly, it is the primary object of the present invention to provide an intake passage construction for an internal combustion engine with a plurality of cylinders, which allows great freedom in the design of the lengths of the intake tubes which lead to the various cylinders of the engine.

It is a further object of the present invention to provide an intake passage construction for an internal combustion engine with a plurality of cylinders, which allows for proper design of the lengths of the intake tubes which lead to the cylinders, in order to take proper advantage of the intake pulsation effect.

It is a further object of the present invention to provide an intake passage construction for an internal combustion engine with a plurality of cylinders, which allows for proper design of the lengths of the intake tubes which lead to the cylinders, in order to take proper advantage of the intake inertia effect.

It is a further object of the present invention to provide an intake passage construction for an internal combustion engine with a plurality of cylinders, which allows for proper design of the lengths of the intake tubes which lead to the cylinders, in order properly to avoid the intake interference effect.

It is a further object of the present invention to provide an intake passage construction for an internal combustion engine with a plurality of cylinders, which allows for freedom of design of the lengths of the intake tubes which lead to the cylinders, in order to obtain high volumetric efficiency of the internal combustion engine.

It is a further object of the present invention to provide an intake passage construction for an internal combustion engine with a plurality of cylinders, which allows for a surge tank incorporated in said construction to be mounted quite close to said internal combustion engine, without limiting the freedom in design for the lengths of the intake tubes which lead to the cylinders of the internal combustion engine.

It is a further object of the present invention to provide an intake passage construction for an internal combustion engine with a plurality of cylinders, which allows for good assembly convenience for a vehicle incorporating said construction.

It is a further object of the present invention to provide an intake passage construction for an internal combustion engine with a plurality of cylinders, which allows for good servicing convenience for a vehicle incorporating said construction.

It is a further object of the present invention to provide an intake passage construction for an internal combustion engine with a plurality of cylinders, which is rigid.

It is a further object of the present invention to provide an intake passage construction for an internal combustion engine with a plurality of cylinders, which is suitable for being produced by casting.

According to the present invention, these and other objects are accomplished by, for a multi cylinder internal combustion engine: an intake passage construction, comprising: (a) a surge tank comprising a wall and an inlet through which air is admitted into said surge tank; and (b) a plurality of intake tubes, each comprising a defining wall and leading from said surge tank to one of said cylinders of said internal combustion engine; (c) wherein an upstream part of each of said intake tubes is wrapped around said surge tank and extends along said wall of said surge tank.

According to such a structure, since the intake tubes for inhaling air into the internal combustion engine are wrapped around the surge tank, their lengths are not particularly limited by the distance between said surge tank and said engine, and accordingly said lengths may be adjusted relatively freely during the design process of the engine and its inlet system, in order to take good advantage of the intake pulsation effect and the intake inertia effect, and to avoid the intake interference effect.

Further, according to a particular aspect of the present invention, these and other objects are more particularly and concretely accomplished by an intake passage construction as described above, wherein at least a part of the part leading from said surge tank of said defining wall of said upstream part of each of said intake tubes which is wrapped around said surge tank is the outside of said wall of said surge tank.

According to such a structure, since the wall of the surge tank also serves as a part of the wall of each of the intake tubes, a rigid and secure construction is attained, which is durable over a long period of use.

Further, according to a particular aspect of the present invention, these and other objects are more particularly and concretely accomplished by an intake passage construction of either of the sorts described above, wherein further a part of each of said intake tubes downstream of said upstream part thereof which is wrapped around said surge tank is also wrapped along said upstream part thereof.

According to such a structure, further convolution of the intake tubes is available, and this means that yet greater freedom in tailoring the lengths of the intake tubes is available during the design process of the internal combustion engine.

Further, according to a particular aspect of the present invention, these and other objects are more particularly and concretely accomplished by an intake passage construction of the sort described above, wherein each of said two parts is formed as a dish shaped member which has an inner skin and an outer structure inwardly delimited by said inner skin, said mutual junction between said two dish shaped members occurring at their mutually abutting edge portions, and wherein said surge tank is defined by the abutting combination of said two inner skins of said two dish shaped members, while said plurality of inlet tubes are defined by the abutting combination of said two outer structures of said two dish shaped members and also by the outer surface of part of said abutting combination of said two inner skins of said two dish shaped members.

According to such a structure, the rather complicated construction of the surge tank and the intake tubes may be conveniently formed, as for example by casting.

BRIEF DESCRIPTION OF THE DRAWINGS

The present invention will now be shown and described with reference to a preferred embodiment thereof, and with reference to the illustrative drawings. It should be clearly understood, however, that the description of the embodiment, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings:

DESCRIPTION OF THE PREFERRED EMBODIMENT

Figure 1:
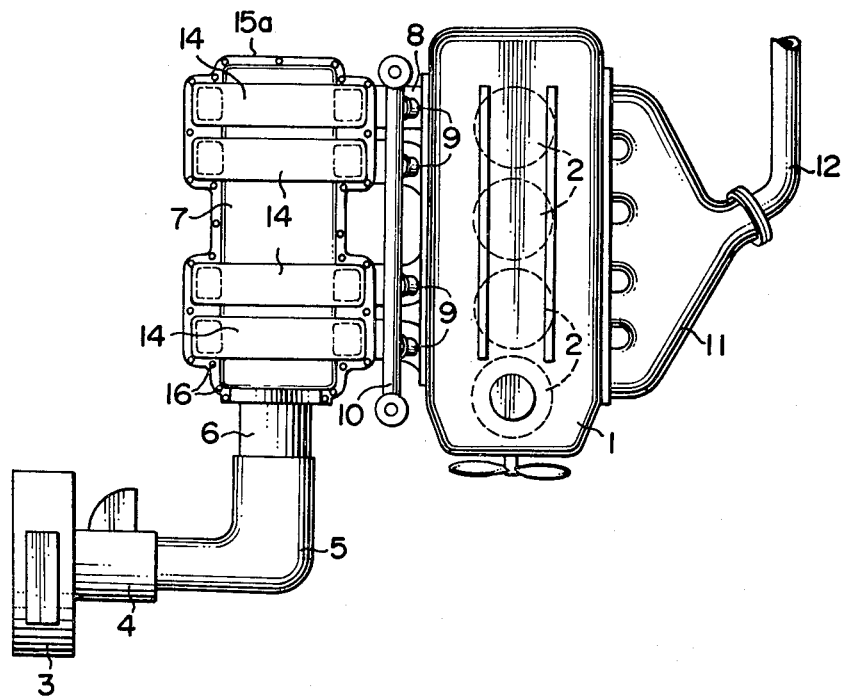
FIG. 1 is a plan view of a fuel injection type internal combustion engine equipped with a preferred embodiment of the intake passage construction according to the present invention.

The present invention will now be described with reference to a preferred embodiment thereof, and with reference to the appended drawings. In the drawings, parts which are shown in several of the figures are designated by the same reference numerals and symbols throughout. FIG. 1 shows a plan view of an internal combustion engine 1 incorporating a preferred embodiment of the intake passage construction according to the present invention, said engine 1 being a fuel injection type gasoline engine which has four in line cylinders each of which is designated by the reference numeral 2. Each of these cylinders 2 inhales air through, in the specified order, a common air cleaner 3, a common air flow meter 4, a common intake tube 5, a common throttle body 6, a common surge tank 7, and its own intake tube 8. The elements upstream of the surge tank 7 are per se well known and conventional, and will not be further particularly described herein. One of the intake tubes 8 is provided as corresponding to each of the cylinders 2 of the engine 1, and is exclusively used by said corresponding cylinder 2 for sucking in air from said surge tank 7. Liquid fuel such as gasoline is supplied to each of the cylinders 2 by a corresponding fuel injector 9 mounted at a downstream part of the intake tube 8 corresponding to said cylinder 2, and fuel is supplied to all of the injectors 9 by a common fuel delivery pipe 10 which leads to a fuel pump of a per se well known sort, not shown in the drawing and not further discussed herein. Exhaust gases are vented from the cylinders 2 of the engine 1 through an exhaust manifold 11 and an exhaust pipe 12, which are also both per se well known.

Figure 2:
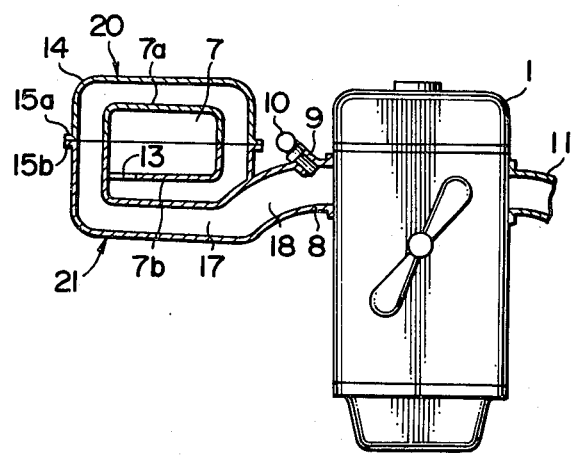
FIG. 2 is a schematic end view of said internal combustion engine and a sectional view of said preferred embodiment of the intake passage construction according to the present invention, taken in a plane which sections one of the intake tubes that lead to the cylinders of the internal combustion engine.
Figure 3:
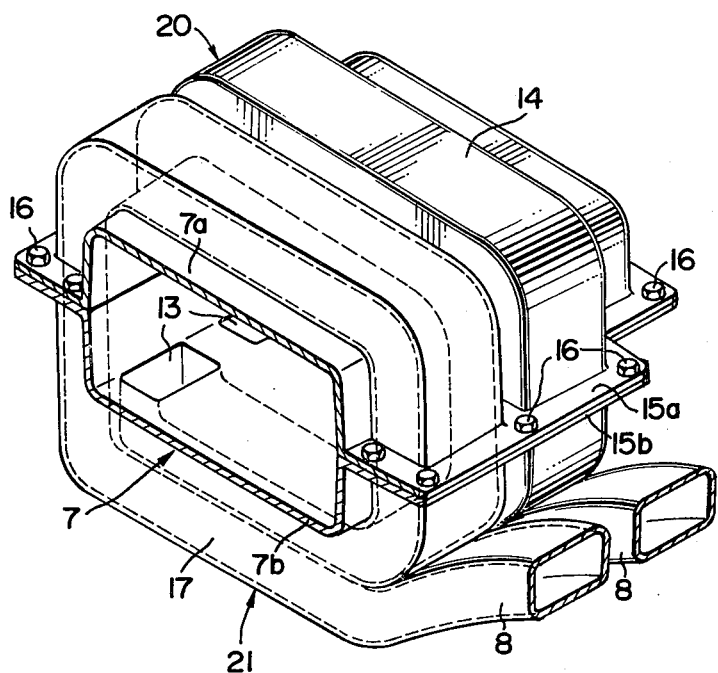
FIG. 3 is an oblique perspective view of part of said preferred embodiment of the intake passage construction according to the present invention, said preferred embodiment being shown at a larger scale than in the previous figures and as sectioned along a plane which passes between two of the intake tubes that lead to the cylinders of the internal combustion engine, and also showing certain parts of said preferred embodiment which are concealed by other parts thereof by phantom lines.

The essence of the present invention relates to the form and the construction of the surge tank 7 and of the four intake tubes 8, and in FIGS. 2 and 3 these parts are shown in detail. The surge tank 7 and the intake tubes 8, in this preferred embodiment, are constructed integrally with one another, and the integral assembly thereof is formed out of two cooperating castings, the upper of which is designated by the reference numeral 20 in the figures, while the lower is designated as 21. Each of these castings 20 and 21 is roughly dish shaped, and has an inner skin portion, these inner skin portions being respectively denoted in the figures by 7a and 7b. The castings 20 and 21 are secured together at the rims or edges of their dish shapes which abut one another, as will be explained in more detail later, and the abutting inner skin portions 7a and 7b cooperate to define the aforesaid surge tank 7 within the integral assembly. The inlet to this surge tank 7 is defined at its lower end as seen in the plan view of FIG. 1 and is communicated to the throttle body 6, and four outlets 13 for this surge tank 7 are formed as apertures in the lower inner skin portion 7b, at its bottom portion.

The construction of the outer parts of castings 20 and 21 is such that, as seen in FIGS. 2 and 3, an upstream portion 14 of each of the intake tubes 8 is wrapped once completely around said surge tank 7 and extends along the outside of the defining wall of said surge tank 7, passing in order: under said surge tank 7 towards said engine 1, up the side of said surge tank 7 on the side of said surge tank 7 towards said engine 1, over the top of said surge tank 7 away from said engine 1, and down along the side of said surge tank 7 on the side of said surge tank 7 remote from said engine 1. Further, the side of said upstream portion 14 of said intake tube 8 towards said surge tank 7, i.e. the inner side thereof, is defined by the outside of the wall of said surge tank, i.e. is defined by the outside surfaces of said inner skin portions 7a and 7b. This construction enables the length of the intake tubes 8 to be made to be long, without necessitating that the surge tank 7 should be located very far away from the internal combustion engine 1.

The part 17 of each of said intake tubes 8 which is immediately downstream of the aforesaid upstream part 14 thereof which is wrapped around said surge tank 7 and which extends along said wall (7a and 7b) of said surge tank 7, in this preferred embodiment, in fact extends along and is wrapped along said upstream part 14 of said intake tube 8, passing under said surge tank 7 and under the first portion of said upstream part 14 of said intake tube 8, towards said engine 1 again. Downstream of this part 17 of each of said intake tubes 8 comes the part 18 thereof which is free of said surge tank 7 and which traverses the space (which is relatively narrow) between said surge tank 7 and said engine 1. It is in this part 18 of said intake tube 8 that said fuel injector 9 is fitted.

In fact, the two castings 20 and 21 are fastened together at their mutually abutting edge portions via two outer laterally extending flanges 15a and 15b formed respectively on them, each of said flanges 15a and 15b being pierced with a plurality of holes. A plurality of bolts 16 are passed through said holes, and these bolts 16 fasten together said two castings 20 and 21. A gasket may be interposed between the two flanges 15a and 15b for sealing purposes, although no such gasket is in fact incorporated in the shown construction.

According to the principles of the present invention, because the intake tubes 8 are convoluted by being thus wrapped around the surge tank 7, their lengths can be tailored to suit the general characteristics of the internal combustion engine 1, from the point of view of taking advantage of the intake pulsation effect and of the intake inertia effect, and so as to minimize the intake interference effect. If necessary, as in the shown preferred embodiment, a part 17 of each of said intake tubes 7 downstream of said upstream part 14 thereof which is wrapped around said surge tank 7 may further be wrapped along said upstream part 14 thereof. This further convolution aids further the process of making the intake tubes 8 long. Further, the shown construction, in which part of the part towards said surge tank 7 of said defining wall of said upstream part 14 of each of said intake tubes 8 which is wrapped around said surge tank 7 is the outside of said wall 7a or 7b of said surge tank 7, is very convenient for producing a rigid structure, and one which is suitable for casting.

Although the present invention has been shown and described with reference to a preferred embodiment thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiment, or of the drawings, but solely by the scope of the appended claims, which follow.

What is claimed is:

1. An intake passage construction for a multi-cylinder combustion engine, comprising:
  (a) a surge tank of a tubular shape having a rectangular cross section, comprising a side wall which defines four sides of said rectangular cross section, and an inlet through which air is admitted into said surge tank; and
  (b) a plurality of intake tubes of a rectangular cross section having four sides, each comprising a first portion formed all around said surge tank with said side wall of said surge tank serving as a common wall portion which defines one side of the four sided rectangular cross section of said intake tube, a second portion connected to said first portion and formed on said first portion of said intake tube over the width of one side of the four-sided rectangular cross section of said surge tank with one side wall portion of said first portion of said intake tube serving as a common wall portion which defines one side of the four sided rectangular cross section of said second portion of said intake tube, and a third portion connected to said second portion and having an independent tubular wall portion, thus providing a spiral intake tube, an inner end of which is opened into said surge tank and an outer end of which is in communication with one of the cylinders of the internal combustion engine, said outer ends of said tubes being connected to said engine along a common side thereof.

2. An intake passage construction according to claim 1, wherein said intake passage construction is an assembly of first and second unitary half blocks assembled along a phantom plane which extends axially through a central portion of said rectangular cross section of said surge tank in parallel to one of the four sides of said rectangular cross section of said surge tank along which said second portion of said intake tube extends.

3. An intake passage construction according to claim 2, wherein said two half blocks are formed with flange portions along their peripheral portions at which they join to each other, and are assembled together by said flange portions being fastened together by disconnectable fastening means.

* * * * *